US006614804B1

(12) United States Patent
McFadden et al.

(10) Patent No.: US 6,614,804 B1
(45) Date of Patent: Sep. 2, 2003

(54) METHOD AND APPARATUS FOR REMOTE UPDATE OF CLIENTS BY A SERVER VIA BROADCAST SATELLITE

(75) Inventors: Andrew T. McFadden, Cupertino, CA (US); Mark Wagner, San Mateo, CA (US); Wei Huang, Mountain View, CA (US); Dean J. Blackketter, San Francisco, CA (US); Michael A. Killianey, San Mateo, CA (US); Alan G. Bishop, Campbell, CA (US)

(73) Assignee: WEBTV Networks, Inc., Mountain View, CA (US)

( * ) Notice: Subject to any disclaimer, the term of this patent is extended or adjusted under 35 U.S.C. 154(b) by 0 days.

(21) Appl. No.: 09/273,697

(22) Filed: Mar. 22, 1999

(51) Int. Cl.[7] .................................................. H04J 3/16
(52) U.S. Cl. ........................ 370/468; 370/316; 709/226
(58) Field of Search ................................. 370/468, 315, 370/316, 321, 326, 327, 328, 329, 390, 392, 432; 710/19, 20, 21; 709/104, 226, 232, 238, 242, 246, 102, 203, 208, 201; 717/4, 11

(56) References Cited

U.S. PATENT DOCUMENTS

| | | | | |
|---|---|---|---|---|
| 5,600,573 A | * | 2/1997 | Hendricks et al. | 709/219 |
| 5,659,350 A | * | 8/1997 | Hendricks et al. | 348/6 |
| 5,737,009 A | * | 4/1998 | Payton | 348/7 |
| 5,790,796 A | * | 8/1998 | Sadowsky | 709/221 |
| 5,862,325 A | * | 1/1999 | Reed et al. | 709/201 |
| 5,886,995 A | * | 3/1999 | Arsenault et al. | 370/477 |
| 5,919,247 A | * | 7/1999 | Van Hoff et al. | 709/217 |
| 6,009,274 A | * | 12/1999 | Fletcher et al. | 717/11 |
| 6,029,196 A | * | 2/2000 | Lenz | 709/221 |
| 6,049,333 A | * | 4/2000 | LaJoie et al. | 345/718 |
| 6,070,012 A | * | 5/2000 | Eitner et al. | 717/11 |
| 6,080,207 A | * | 6/2000 | Kroening et al. | 717/11 |
| 6,115,745 A | * | 9/2000 | Berstis et al. | 709/227 |
| 6,151,643 A | * | 11/2000 | Cheng et al. | 710/36 |
| 6,154,465 A | * | 11/2000 | Pickett | 370/466 |
| 6,160,988 A | * | 12/2000 | Shroyer | 725/63 |
| 6,167,567 A | * | 12/2000 | Chiles et al. | 709/201 |
| 6,199,204 B1 | * | 3/2001 | Donohue | 717/11 |
| 6,233,730 B1 | * | 5/2001 | Todd et al. | 717/4 |
| 6,292,835 B1 | * | 9/2001 | Huang et al. | 709/235 |
| 6,388,714 B1 | * | 5/2002 | Schein et al. | 348/563 |
| 6,477,707 B1 | * | 11/2002 | King et al. | 725/97 |

* cited by examiner

Primary Examiner—Douglas Olms
Assistant Examiner—Phirin Sam
(74) Attorney, Agent, or Firm—Workman, Nydegger & Seeley

(57) ABSTRACT

The invention involves transmission download of data to plural, mass storage medium-based remote users of content or software upgrades or multiple versions. Optionally provided are pre-download scheduling of one or more future download sessions and post-download remote scripted software execution by the remote clients. For purposes of more efficient use of the transmission link, low-volume scheduling information or content are transmitted within designated narrow-bandwidth sub-channels or trickle streams allocated within the broad bandwidth of the transmission channel and such allocation may be dynamic to vary the allocation based upon relative high-volume, high-speed and low-volume, low-speed demands. The invention is implemented in software residing primarily in the server computer connected with the transmission provider. The software schedules allotted bandwidth within the broadcast band of the transmission link and formats high-volume data for transmission within sub-allocation channels logically devised therein. Client software at the plural distributed home entertainment device sites reserves capacity on disk and receives such transmission data for storage thereon, optionally executing a downloaded execution script that may reconfigure the client software so that new options and features are available at the client site for operational enhancements as well as video program or content enhancements. Client software at the plural distributed home entertainment device sites reserves capacity on disk and receives such broadcast data for storage thereon, optionally executing a downloaded execution script that may reconfigure the client software.

34 Claims, 9 Drawing Sheets

METHOD AND APPARATUS FOR REMOTE UPDATE OF CLIENTS BY A SERVER VIA BROADCAST SATELLITE

TECHNICAL FIELD

The present invention relates to downloading data such as video program material and software or firmware to plural remote subscribers for storage of the data in a storage device operatively connected with a home-entertainment device. More specifically, it concerns the use of existing satellite communications for downloading data to entertainment devices connected to a user's television, the device having operatively connected thereto a disk drive for mass storage of data and the device controlling certain cable and global network functions made available to subscribers.

BACKGROUND OF THE INVENTION

Moving data from place to place electronically has become a vast enterprise in modern society. Telephones are used to transport voice signals between callers. Facsimile machines are employed to send documents to remote sites. Computers exchange digital data over modems. Radio signals broadcast audio programming to listeners. Television transmissions convey video signals to viewers in almost every home.

A variety of mechanisms or channels are available to send the different types of data. For instance, telephone calls, facsimile transmissions and modem transfers of digital data all can be completed over plan old telephone service (POTS) lines. Radio and television broadcasts are normally broadcast from transmission towers and satellites and sent over cable systems. With each of these channels, the data carrying capacity, or bandwidth, is governed by the nature of the data normally sent over the channel. Thus, POTS, being adapted to transmit voice data, has a relatively low bandwidth while typical television broadcast channels are relatively high bandwidth in order to convey the high volume of data inherent in a video signal.

In addition to considerations of bandwidth, the type of data that can be transmitted over a given channel is governed by whether or not the channel is bi-directional. Of the three main data transmission systems found in most residences—telephone, radio frequency broadcast and cable—only telephone is inherently bi-directional. Thus, although other technologies are being developed, the telephone has been the channel of choice when data must be transmitted bi-directionally to and from a residence.

With the advent of the Internet, there has been explosive growth in the number of people that use their phone lines to access digital data from resources available on line. These resources include World Wide Web pages providing access to various types of digital data, such as still images and audio and video content. In some cases, the amount of data to be transferred challenges the bandwidth available on phone lines. In other cases, so many users are accessing the same data, that the separate repetitive transfer of the data to each of the users independently is inefficient.

One system in which both the bandwidth and repetitive transfer issues arise is the WEBTV® Internet access network. (WEBTV is a registered trademark of WebTV Networks, Inc. of Mountain View, Calif.) The WEBTV Internet access network includes a large number of Internet terminals, also referred to as client terminals, and at least one Internet server. While the client terminals can access the Internet directly under some circumstances, the server provides a convenient standardized interface to facilitate access of the Internet by the client terminal. The server also offers supplemental services, such as email, news reports, television program guides and enhanced access to certain Web pages. In the course of carrying out these supplemental services, substantial quantities of individualized or private data, and broadly applicable or public data, must be downloaded to the client terminals.

With the current WEBTV system, supplemental services data is downloaded in advance during low-use periods to the extent possible. For instance, WEBTV client terminals are configured to automatically call in to the server during the night to check for email and receive other information. However, because this process must be individually repeated for each client terminal, substantial telephone costs may be incurred by the subscription user or the service provider or both. In addition, in some cases, the quantity of data to be retrieved is so large that long periods of time are required to complete the download.

Known download techniques are data volume and bandwidth limited, the former by remote entertainment device semiconductor memory capacity, and the latter by use of POTS or other low-bandwidth content and software data channels. High-volume data such as a) video data referred to herein as content, or b) operating or applications system software upgrades referred to herein as software, often need to be downloaded from a subscription service provider, or server, to distributed plural remote users at subscriber sites where home entertainment devices exist. It is desirable to provide such a high-speed, high-volume conveyance without further taxing POTS or ISDN, which may be thought of as low-speed, two-way conveyances (the former being voice grade ($\leq$ approximately 50 kilobits/second (kbps)) and the latter being only somewhat above voice grade ($\leq$ approximately 100–200 kbps). This is as compared with high-speed, one-way satellite broadcast conveyances, the download rate from of which may be more than approximately 1–4 megabits/second (Mbps).

SUMMARY OF THE INVENTION

Such high-volume data download may be done via existing satellite broadcast service providers in a high-bandwidth, one-way communication to all. Alternatively, such data download may be done via other broadcast transmission methods such as cable or digital television broadcasts. All subscribers, or clients, will receive the download, whether it is of video or other content data to be stored to non-volatile memory for later viewing, or software upgrade data to be stored to ROM for optional use as the client's operating system (OS). In the case of a software upgrade, each client must decide whether and how to implement the upgrade, as by executing a configuration or other script the data might include. Thus, the low-speed, bi-directional conveyances such as POTS and ISDN are not further taxed by a satellite-based approach as described herein.

Two aspects of the invention may be summarized as including transmission download of data to plural remote clients of content or software upgrades or alternative versions (e.g. a beta version of some new software release may be tested optionally and feedback solicited from a user of the client for the benefit of the software developer). Optionally provided are pre-download scheduling of one or more future download sessions and post-download remote scripted software execution by the remote clients. For purposes of more efficient use of the transmission link, low-volume scheduling information or content are transmitted within designated narrow-bandwidth sub-channels or trickle streams allocated within the broad bandwidth of the transmission channel and such allocation may be dynamic to vary the allocation based upon relative high-volume, high-speed and low-volume, low-speed demands.

The invention is implemented in software residing primarily in the server computer connected with the transmission provider. The software schedules allotted bandwidth within the broadcast band of the transmission link and formats high-volume data for transmission within suballocation channels logically devised therein. Client software at the plural distributed home entertainment device sites reserves capacity on disk and receives such transmission data for storage thereon, optionally executing a downloaded execution script that may reconfigure the client software so that new options and features are available at the client site for operational (e.g. OS, application, graphic user interface (GUI) or other software that runs the home entertainment device such as a television set-top box) enhancements or content (e.g. video) offerings. It will be appreciated that downloaded content may include text, audio or video files, hypertext mark-up language (HTML) or other ISP-provided pages or images, pay-per-view (PPV) movies, a cable provider's electronic program guide (EPG), etc.

DETAILED DESCRIPTION OF THE INVENTION

Figure 1:
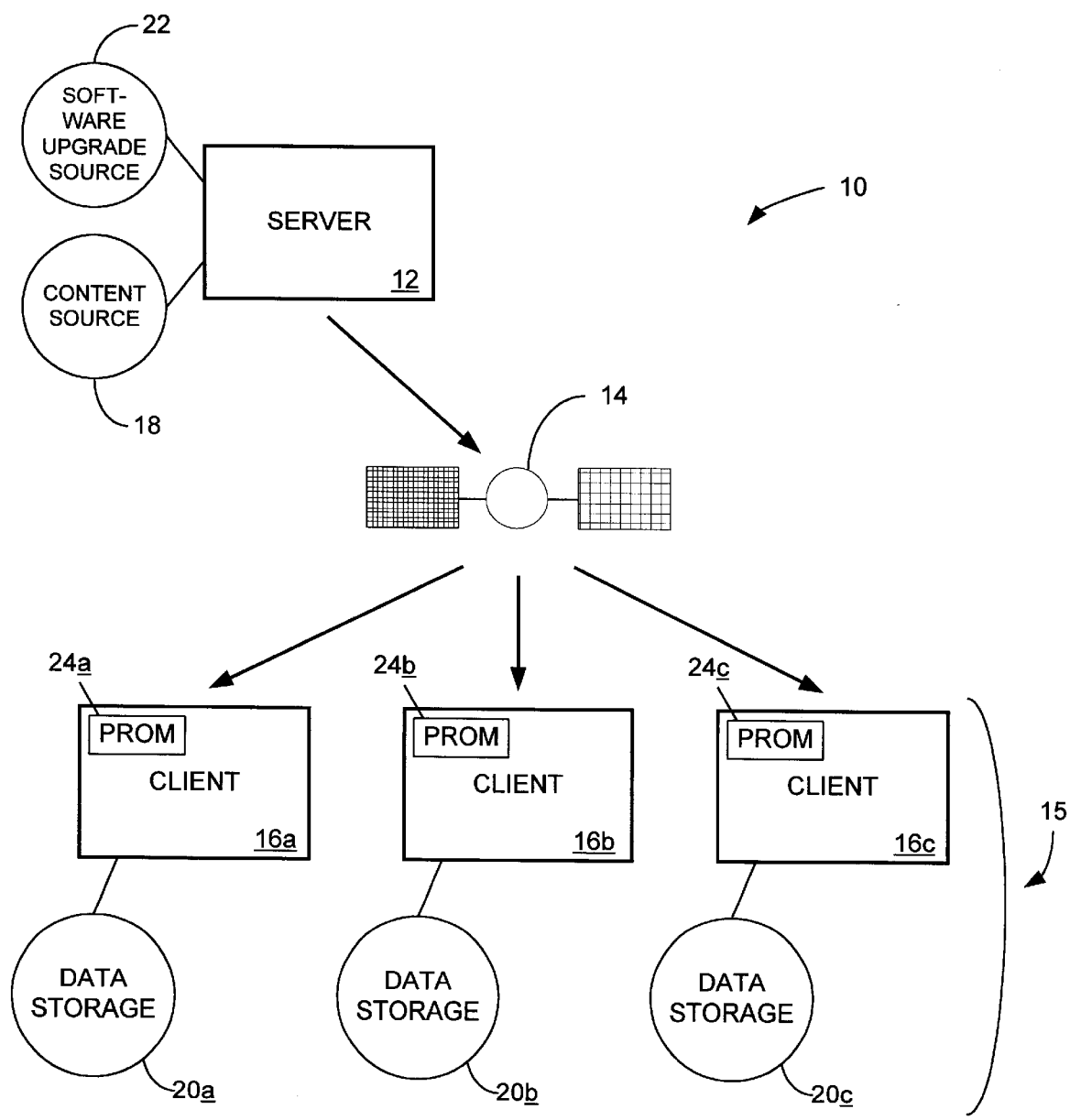
FIG. 1 is a system block diagram illustrating the download scheduling control paths in accordance with the invention via a low-speed channel of the high-speed broadband digital video down-link in accordance with the invention.

FIG. 1 illustrates the invented apparatus in system block diagram form at 10. Apparatus 10 includes a server 12, a satellite broadcast service provider 14 and a network of plural distributed clients 16a, 16b, 16c that number only three for the sake of simplicity. Server 12 performs several functions related to the present invention and may be a service provider such as a WEBTV server or other provider of subscription services to plural remote users. First, server 12 formats content to provide via satellite to client network 15. Additionally, server 12 schedules downloads and other tasks needed to accomplish such downloads to the clients. Finally, server 12 allocates the satellite broadcast bandwidth provided by the satellite service provider among the content to be downloaded.

In implementing these functions, server 12 interfaces to one or more content providers such as content provider 18 and interfaces to one or more transmission providers such as satellite broadcast service provider 14. Those of skill in the art will appreciate that the one or more content providers and the one or more satellite broadcast service providers may be configured conventionally and that their particular configurations form no part of the present invention.

While the invention is herein depicted and described in the context of downloading data to plural distributed clients via a satellite broadcast link, those of skill in the art will appreciate that other transmission links may be used and, thus, are within the scope of the invention. For example, transmission provider 14 may alternatively be a cable broadcast provider enabling data downloads via a cable link, or a digital television broadcast provider enabling data downloads via a broadcast link. Therefore, while transmission provider 14 is hereinafter described as a satellite broadcast service provider, the description will be understood to include such other transmission providers.

Server 12 is connected to communicate with a television program content data provider or other content source 18 such as an Internet Service Provider (ISP) as well as satellite-based data broadcast service provider 14. Plural remote computer-based systems 16a, 16b, 16c each include a mass data storage subsystem 20a, 20b, 20c and each is connected to service provider 14 for receiving and storing into the storage subsystem the television program or other graphic content data from the data provider. It will be appreciated that mass storage subsystem 20a, 20b, 20c may be a magnetic disk, a writable optical disk, flash memory, prom, or any other type of non-volatile electronic data storage device. For clarity, mass storage subsystem 20a, 20b, 20c will be referred to herein as disk 20a, 20b, 20c, by way of example but will be understood to include any of such storage devices.

It may be seen from FIG. 1 that server 12 also may be operatively connected with a software upgrade source 22 from which operating system (OS) software upgrades may be made to clients 16a, 16b, 16c. Such upgrades may represent fixes to 'bugs' or simply performance or reliability enhancements for the firmware typically residing at the clients 16a, 16b, 16c in non-volatile memories such as read-only memories (ROMs) or programmable non-volatile memories such as programmable read-only memories (PROMs) 24a, 24b, 24c therein. Those of skill in the art will appreciate that PROMs 24a, 24b, 24c may take an alternative form of storage of the operating system software downloaded in accordance with the invention from software upgrade source 22 via server 12 and broadcast satellite service provider 14. For example, the PROMs may take the form of flash memory or magnetic or optical storage disks.

Figure 2:
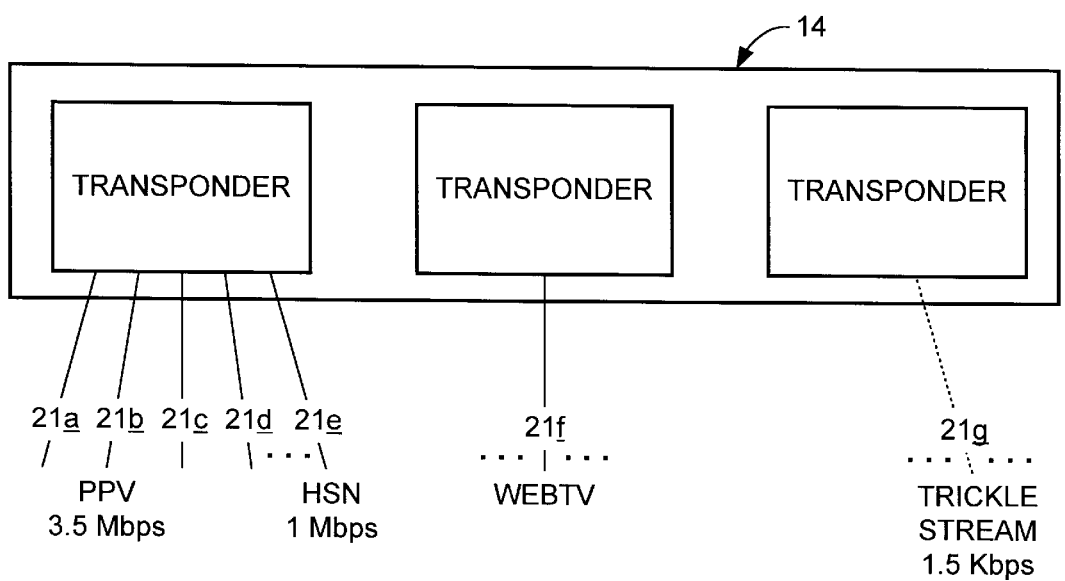
FIG. 2 is a schematic diagram of the broadband satellite frequency spectrum illustrating a possible allocation of the spectrum to the various video content and software upgrade functions.

FIG. 2 is a diagram showing a possible allocation of the broadcast satellite's broad bandwidth to the task of downloading video content and software upgrades to the plural distributed subscribers or clients. It may be appreciated from FIG. 2 that the bandwidth allocation may be fixed or variable and that it may be dynamically responsive to changing requirements, whether they be requirements of the satellite broadcast service provider or the various distributed clients associated with the server. The bandwidth may be seen to be illustrated as a continuum of frequencies within the broad spectrum of the satellite broadcast bandwidth. It may be seen that the individually labeled logical channels 21a–g are defined and their bandwidths allocated to particular functions.

These assigned functions include the relatively broadband video content downloading functions labeled "PPV", "WEBTV" and "HSN" (high-speed network) or the relatively narrow-band schedule downloading function labeled "TRICKLE STREAM." It will be appreciated that the blocks labeled TRANSPONDER are an integral part of satellite broadcast service, or service provider, 14 and form no part of the invention other than illustrating the important broadband channel allocation scheme.

Those skilled in the art will appreciate that the channels may be defined in any suitable manner, and thus the allocation of bandwidth made, in accordance with the invention. Those skilled in the art also will appreciate that as many channels may be defined and their bandwidths allocated as provided by the satellite service provider in accordance with contract, i.e. the unlabeled channels may be assigned their corresponding functions and more channels may be allocated, as suggested by ellipses, by server software suitably programmed. In any event, while satellite service provider 14 allocates a total bandwidth for use by server 12, it is the server which allocates or assigns the channels within that bandwidth to specific download functions such as PPV, web content, software upgrades, scheduling announcements, etc. As discussed above, the server is configured to allocate the bandwidth dynamically among the various download functions depending what content is scheduled for download.

Figure 3A:
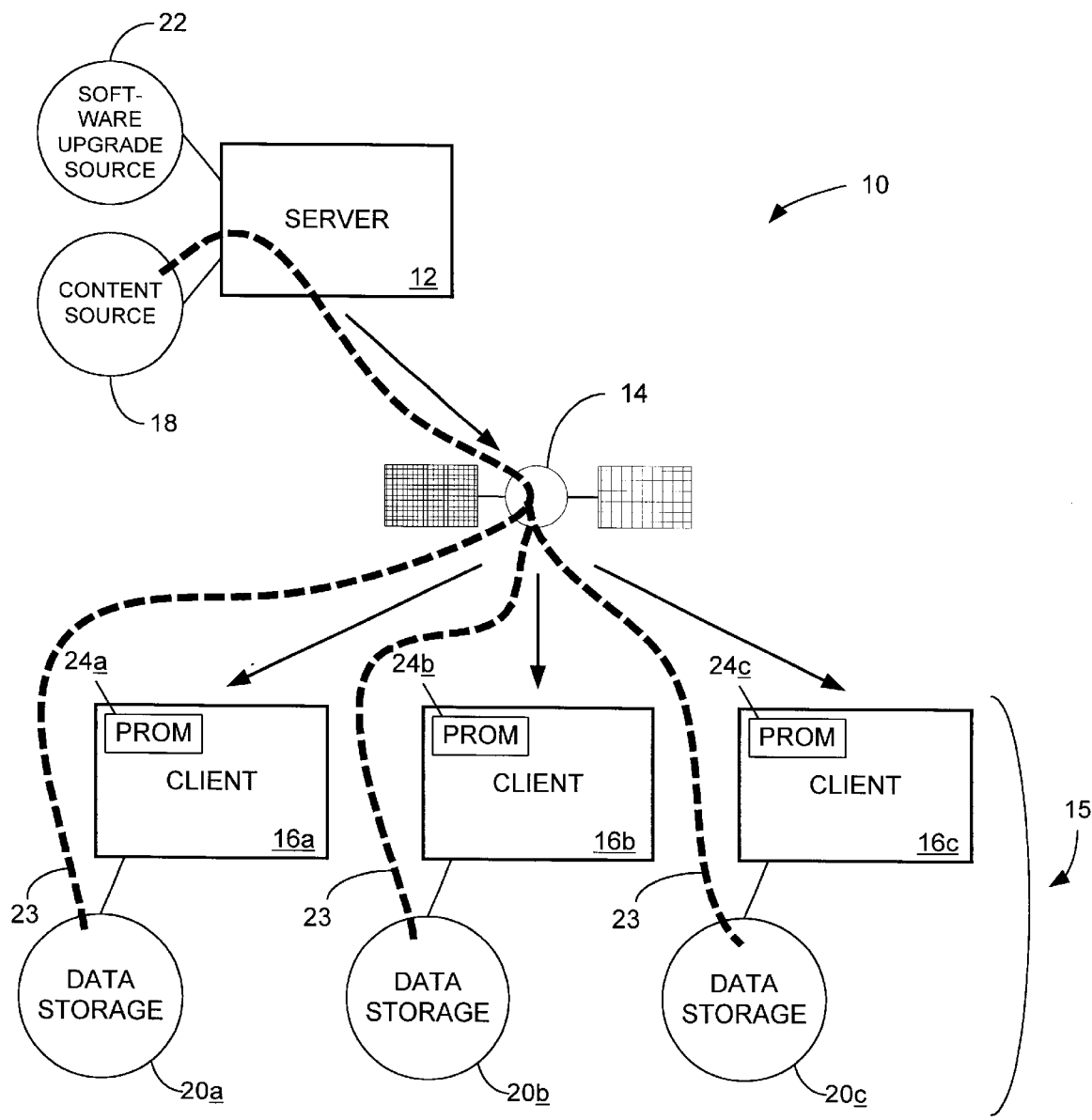
FIGS. 3A and 3B are system block diagrams corresponding to FIG. 1 and illustrating the data download paths in accordance with the invention via a high-speed channel of a high-speed broadband digital down-link in accordance with the invention, with FIG. 3A showing a typical video content download and with FIG. 3B showing a typical software upgrade download.
Figure 3B:
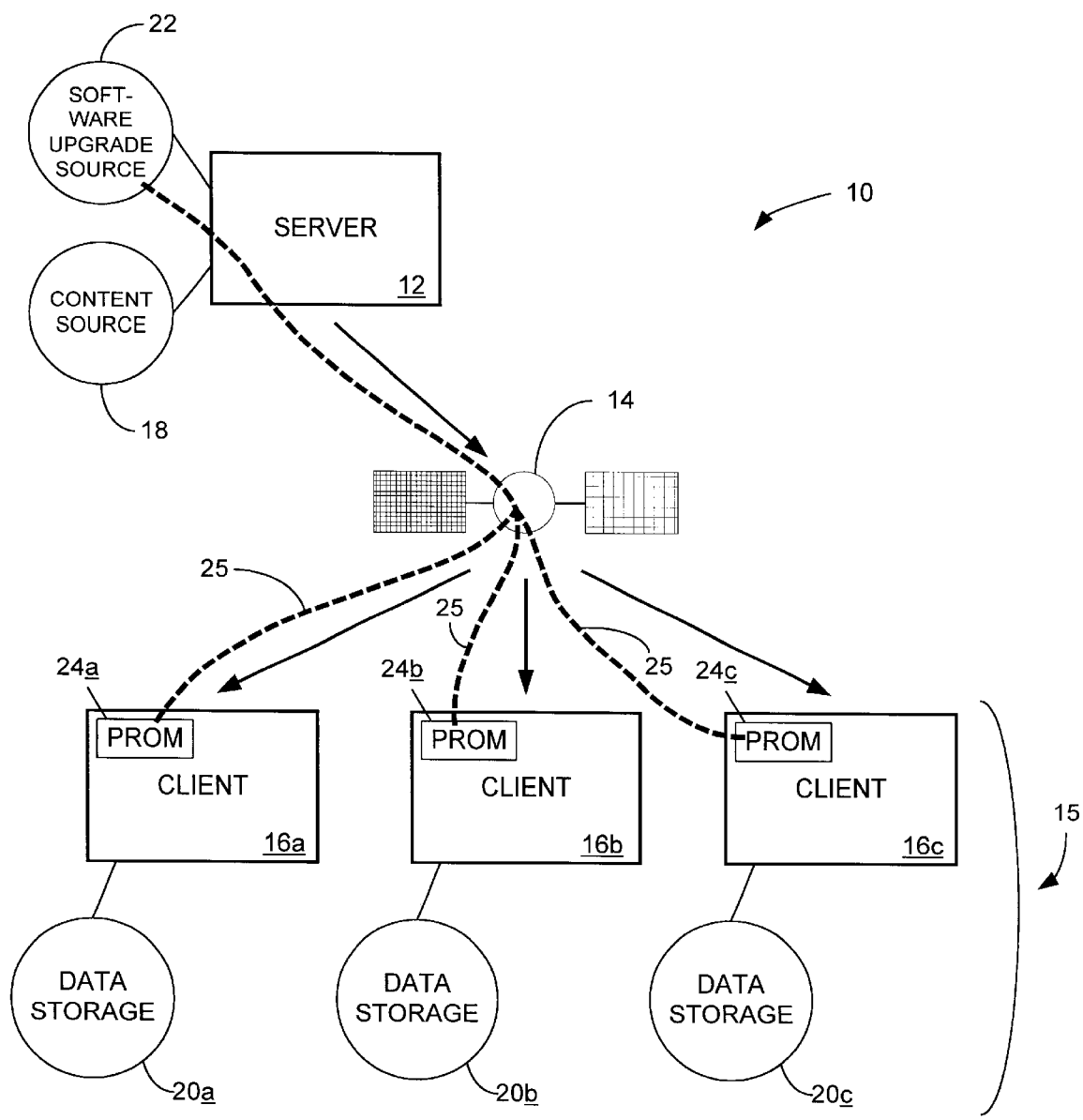

FIGS. 3A and 3B illustrate the video and software data download paths used to load video content or software upgrades to a disk or PROM of each of the subscribers or clients programmed to receive such a broadcast. The broad dashed line 23, in FIG. 3A, illustrates a relatively high-bandwidth data path representing the downloading of content from content source 18 by server 12 via broadcast satellite service provider 14 to disks 20a, 20b, 20c of clients 16a, 16b, 16c, respectively. Again, content herein describes text, HTML pages, images, movies, EPGs or other graphic, audio, or video data-intensive content requiring relatively high bandwidths for its efficient and quick conveyance. Content source 18 may take any suitable form, i.e. it may be a videotape, videodisk, CDROM, video library or simply an operative connection to a source provider, e.g. a cable television system or global network. Disks 20a, 20b, 20c typically are large capacity, e.g. they may store up to approximately 100–500 megabytes (MB) or 1–10 gigabytes (GB) of data.

The narrower dashed line 25, in FIG. 3B, illustrates another high-bandwidth data path representing the downloading of software upgrade data from software upgrade source 22 by server 12 via broadcast satellite service provider 14 to PROM 24a, 24b, 24c of clients 16a, 16b, 16c, respectively. Software upgrade source 22 may take any suitable form, i.e. it may be a storage module such as a disk or tape or a file server on a database network. It will be appreciated that a software upgrade may be as simple as a PROM code patch to correct a software bug or enhance performance of the home entertainment device, or that it may be as complex as a new OS including entirely new or replacement firmware. It also will be appreciated that a software upgrade may be an alternative version of firmware for testing purposes, e.g. it may be beta or field test software which is predicate to a new software release.

It also will be appreciated that part of a software upgrade download may include executable instructions or code that represents a script that, when executed by a client, automatically reconfigures the client. An example of such a configuration script would be a 'reboot' or 'power-up' script that, once executed, changes the operational parameters of the home entertainment device.

It will be appreciated that content and software upgrade broadcast downloads may occur concurrently or at different times, depending upon the demand for each and the available bandwidth in accordance with a satellite broadcast service contract or allocation, efficiency or cost concerns. For example, 2 GB/night of total capacity may be allocated by a particular broadcast service provider, which would represent approximately 1–4 Mbps data conveyance. It will be appreciated that various factors including availability and cost determine how much download capacity is desired in a given system and how it should be allocated.

In accordance with the method of the invention, downloads of software upgrades or content may be scheduled by broadcasting an instruction or scheduling announcement to all clients via satellite on a relatively low-bandwidth channel, referred to herein as a TRICKLE STREAM channel. The scheduling announcement would include a schedule as to when the next download of software upgrade or content will occur. Thereafter, any client that is tuned to the predefined high-bandwidth channel at the scheduled time will receive the software upgrade or content update, respectively. Along with the downloaded software upgrade might be an instructional message informing all clients how to decide which if any software upgrades an individual client might implement. Such category-based filtering logic executed by particular clients may be hardwired into the home entertainment device at the time of manufacture or may be configured via so-called telephone company-type (TELCO) or other bi-directional system set-up commands when the user selects a subscription service provider.

For example, at the time a user connects a client such as a home entertainment device to a service, it may be determined that the client agrees to be a beta test customer, in which case a beta category flag will be set and resident client software thereafter upon receiving a software upgrade identified by the server as beta test software would implement the upgrade whereas a client that is not a beta customer would receive such an upgrade as part of a broadcast but would not implement the upgrade. Other software upgrades broadcast by the server may be implemented or not by a particular client based upon such categories and filtering, or upon other selection criteria implemented by the client.

Broadcast satellite service provider 14 is involved, as indicated in FIGS. 3A and 3B, in all such downloads, in accordance with the allocation scheme that is illustrated in FIG. 2 and described above. It may be seen from FIGS. 3A and 3B that downloads are unidirectional, i.e. data flows only in one direction, and there is no requirement for two-way, connected-pair client-server communication as was the case with the use of POTS or ISDN or other voice or modem connections. Moreover, of course, the data download involves a very high bandwidth broadcast of data to many clients at once, whether it is video content data or software upgrade data.

Because of the unidirectional nature of the broadcast and the fact that there is no requirement for a pair-wise connection between a server and a corresponding client, in accordance with the invention, there is no need for a handshake or protocol for two-way communication between a client and a server. It will be appreciated that forward error detection and correction or other suitable techniques may be employed to ensure received-data integrity at the plural distributed clients of data broadcast via broadcast satellite service 14.

It will be appreciated that the broadcast of content or software upgrade and supervisory or announcement data is to multiple clients at once, and that the clients are generally not differentiated. Thus, each of the clients typically receives identical data from the broadcast service provider and each client decides whether and how to respond in accordance with prescribed software or firmware protocols. There is in accordance with the invention no need for two-way communication between server 12 and any of clients 16a, 16b, 16c; instead very high-bandwidth, but only one-way, broadcast communication occurs from server to all clients who are tuned to the frequency over which it has been prescribed that such communication will occur on a system-wide basis in what will be referred to herein as a mass satellite-based data download.

It will be appreciated that the broadcast communication may alternatively occur in selected geographical regions such that only those clients located in the selected region will receive the download. It will also be appreciated that the broadcast communication alternatively may be directed to a defined group among all clients and that the remaining clients may receive a different broadcast communication or no broadcast communication.

Figure 4:
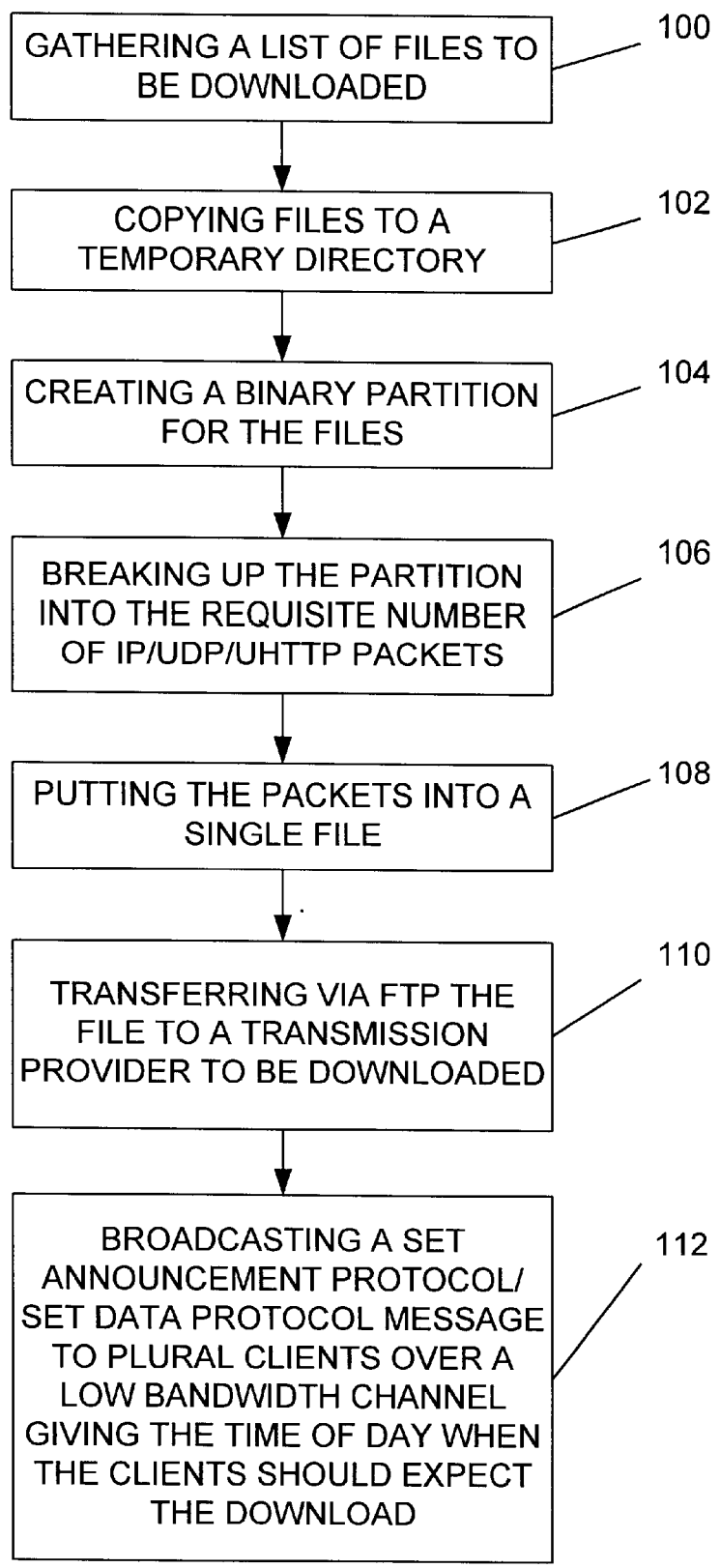
FIG. 4 is a flowchart illustrating the method of the invention corresponding to FIG. 1 by which future video data downloads or software updates may be scheduled for the plural distributed home entertainment devices.

FIG. 4 charts the method of the invention by which future downloads of video content or software upgrades may be scheduled for broadcast to plural distributed clients or subscribers. The invented scheduling method may be seen to include the following steps implemented in software instructions residing in server 12 and executed by a microprocessor, for example, therein. Server 12, at 100, gathers a list of files which are to be downloaded; at 102, copies them to a temporary directory; and at 104, creates a binary "partition" for these files.

As used herein, a binary partition consists of a batch of data selected for downloading to clients 16, and a corresponding filesystem mapping the location of the files into a logical directory. The batch of data may consist of one file or a plurality of files. It will be understood that the filesystem may be any standard filesystem such as FAT, FAT32, etc. which is compatible with disks 20.

Clients 16 are configured to distinguish between data downloaded as a binary partition and data downloaded as one or more unrelated files. Upon receipt of a binary partition, each client 16 formats a new disk partition on disk 20 and stores the filesystem and file(s) in the new disk partition. It will be appreciated that storing the downloaded file(s) as a disk partition bypasses the existing filesystem on disk 20 and ensures that the file(s) are stored on the disk without fragmentation. Moreover, storing the file(s) without fragmentation reduces noise from disk 20 when the files are subsequently read from disk 20. Alternatively, server 12 may omit creating a binary partition and transmit the file(s) without a corresponding filesystem. In such case, each client 16 stores the file(s) on disk 20 in an existing partition using the existing filesystem.

In any event, server 12 then breaks up the partition into the requisite number of IP/UDP/UHTTP packets, as indicated at 106. As is well known in the art, IP, UDP, and UHTTP are acronyms for Internet Protocol, User Datagram Protocol, and Unidirectional Hypertext Protocol, which are network communications protocols used to transfer data over a communications network. The IP, UDP, and UHTTP protocols allow a large batch of data to be broken up into small packets at a source such as server 12, transmitted individually to a destination such as clients 16, and then reconstructed into the original batch of data.

The IP, UDP, and UHTTP protocols are embodied as layered instruction headers applied to the small data packets. Each protocol performs different functions. The IP protocol performs the basic routing function, while the UDP protocol adds error-checking and communications port selection. The UHTTP protocol is a modified form of the well known HTTP protocol adapted for use with one-way broadcasts. Clients 16 are configured to read the header instructions on individual packets and, based on the protocols, reconstruct the batch of data from the packets after stripping the headers.

It will be understood that the transmission protocols described above are well known in the art and may be modified as required to conform to varying Internet standards. Furthermore, while the invented method has been described above as using the IP, UDP, and UHTTP protocols to transmit content from server 12 to clients 16, it will be appreciated that other transmission methods and protocols are possible and, thus, within the scope of the invention.

Once the partition is broken up into the requisite IP/UDP/UHTTP packets, server 12, at 108, puts these packets into a single file and, at 110, FTPs the file to satellite broadcast service provider 14, e.g. Echostar, to be downloaded. Responsive to server 12, satellite broadcast service provider 14, at 112, broadcasts a Set Announcement Protocol (SAP)/Set Description Protocol (SDP) message to plural clients 16a, 16b, 16c over a TRICKLE STREAM channel giving the time when the clients should expect the download. Alternatively, the SAP/SDP message may be communicated to plural clients 16a, 16b, 16c via POTS, ISDN or other non-broadcast communication links or channels.

The clients learn from the announcement when the download will take place, and then either inform users to tune to the predefined channel to receive the download or simply auto-tunes to receive the download on the predefined channel at the announced time of day. At the announced time, clients which are tuned to the correct channel begin receiving the IP/UDP/UHTTP packets containing headers that enable the clients to reconstruct the original files. As discussed above, clients are able to receive downloaded individual files as well as whole partitions.

For partitions, clients are told the size of the partition and its name. Clients are told whether the partition is temporary (in which case it is deleted at the end of the download) or permanent. Clients also are told whether there is included in a downloaded partition a download script for later execution. The download script may cause the clients to copy files from a temporary partition to another location, to rename files, to execute "client functions", etc. One such client function is whether the client should substitute new software for old software or a new portion of software for an old portion thereof in the form of a software upgrade.

Figure 5:
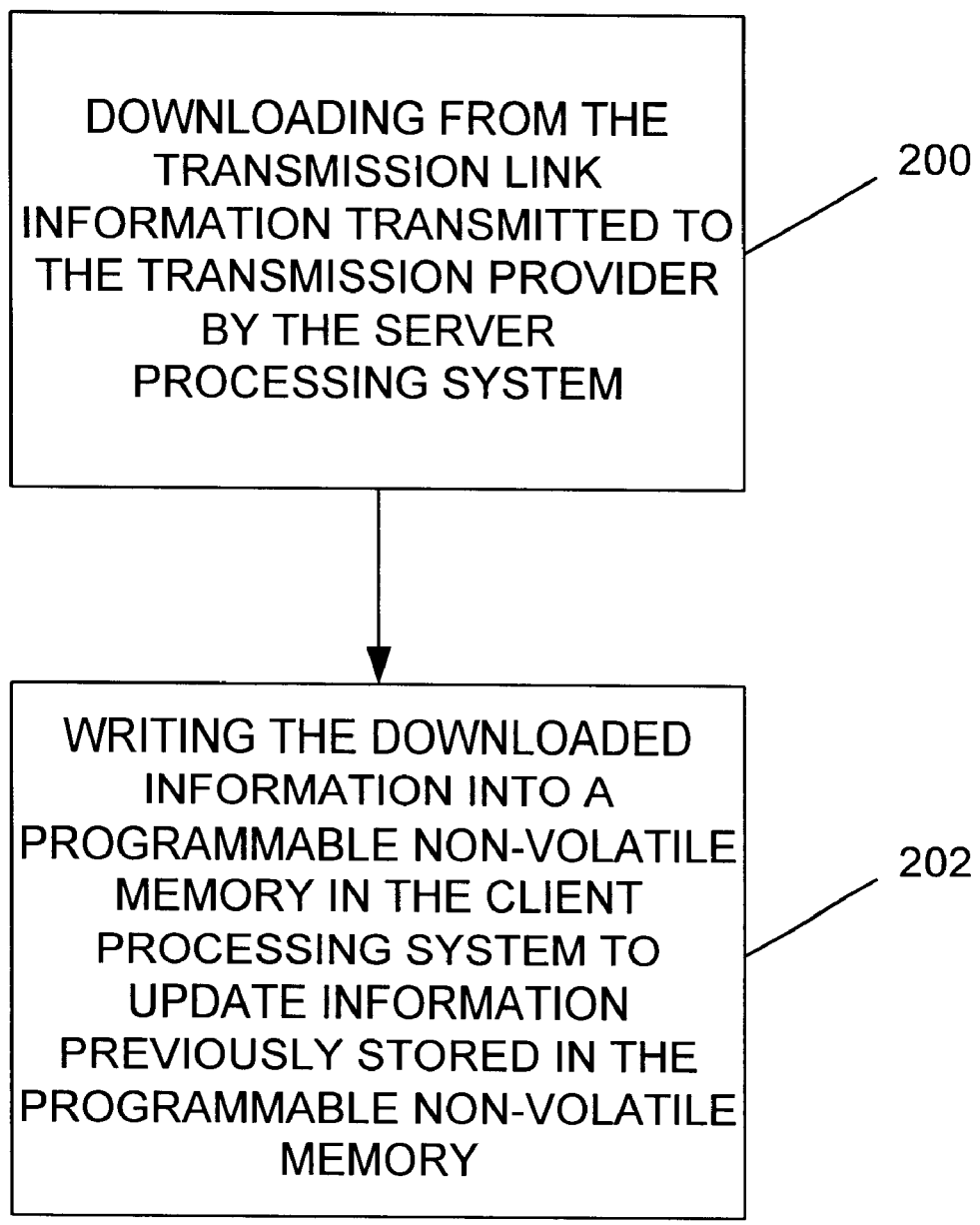
FIG. 5 is a flowchart illustrating the method of the invention corresponding to FIG. 2 by which video data downloads or software upgrades are conveyed to the plural distributed home entertainment devices.

FIG. 5 charts the method of the invention by which video data downloads or software upgrades are conveyed to the clients or subscribers. The invented conveyance method by which a central server downloads video content or software upgrades to a client network having plural distributed clients may be seen to include the following steps. The method involves, at 200, first downloading, from the satellite broadcast link, information transmitted onto the satellite broadcast network from the server processing system, and, at 202, writing the downloaded information into a programmable nonvolatile memory in the client network to update information previously stored in the programmable non-volatile memory.

Figure 6:
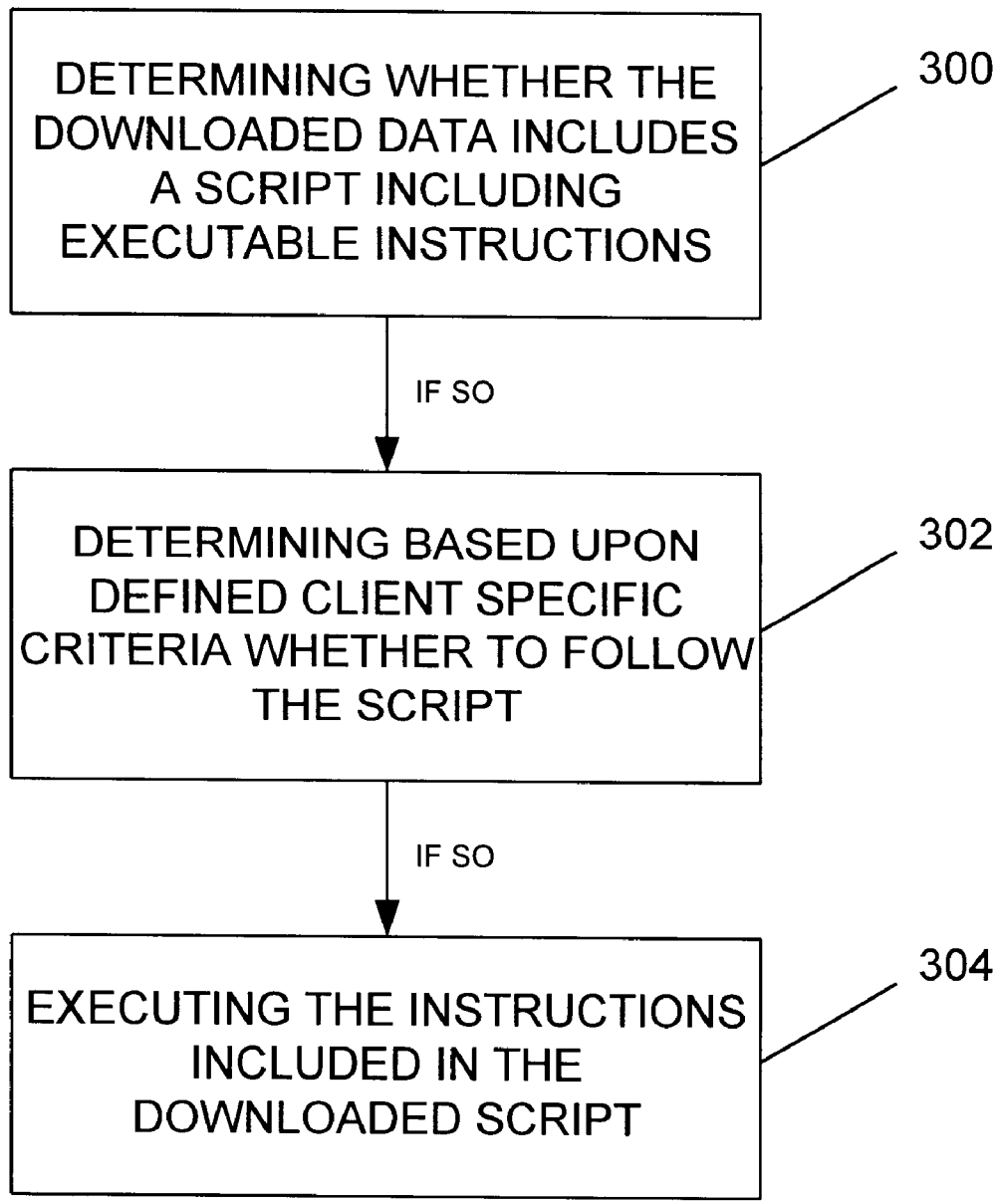
FIG. 6 is a flowchart illustrating the method of the invention corresponding to FIG. 3 by which optionally a downloaded script may be executed following a software upgrade of the plural distributed home entertainment devices.

FIG. 6 charts the method of the invention by which a downloaded script including executable instructions optionally may be executed following a software upgrade of a client or home entertainment device in order to reconfigure the home entertainment device or to upgrade its software content. The invented reconfiguration method by which a client selectively executes a downloaded configuration script including executable instructions may be seen to include the following steps. At 300, determining whether the downloaded data includes a configuration script including executable instructions and, if so, then, at 302, determining, based upon defined client-specific criteria, whether to follow the script and, if so, then, at 304, executing the instructions included in the downloaded script.

As stated above, the determination whether to follow the script may be made based upon stored, client-specific criteria or category information that are previously stored in the client's memory, derived from whatever source. It will be appreciated that the downloaded data may include alternative configuration scripts and that one or more of the alternative configuration scripts may be selected for execution by the client based on defined selection criteria. In any event, such method steps are typically implemented in software residing in a client such as clients 16a, 16b and 16c, which might be a home entertainment device including read-and-write memory (RAM) and a microprocessor.

Figure 7:
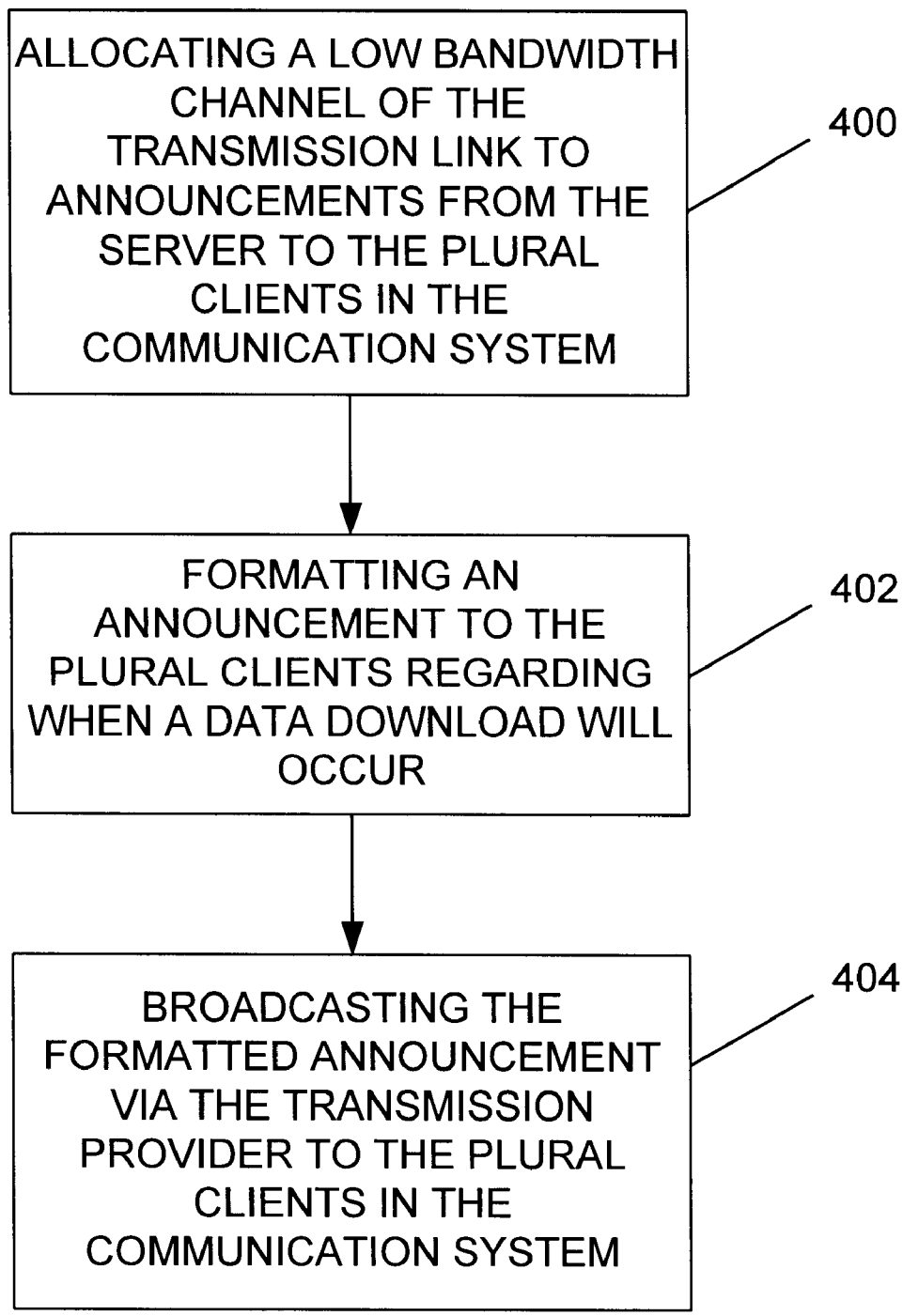
FIG. 7 is a flowchart illustrating the method of the invention corresponding with that of FIG. 4 by which scheduling of a future download may be had.

FIG. 7 charts the method of the invention for scheduling a future download via a satellite broadcast service provider of video content or software upgrade to plural remote clients in a communication system. The steps include, at 400, allocating a low-bandwidth channel of the satellite broadcast band to announcements from the server to the plural clients in the communication system; at 402, formatting an announcement to the plural clients regarding when a data download will occur; and, at 404, broadcasting such a formatted announcement via the satellite broadcast service provider to the plural clients in the communication system. This method is described in another way and in somewhat more detail above. It will be understood that such method steps 400 and 402 in accordance with the invention are typically implemented in software residing in server 12.

Figure 8:
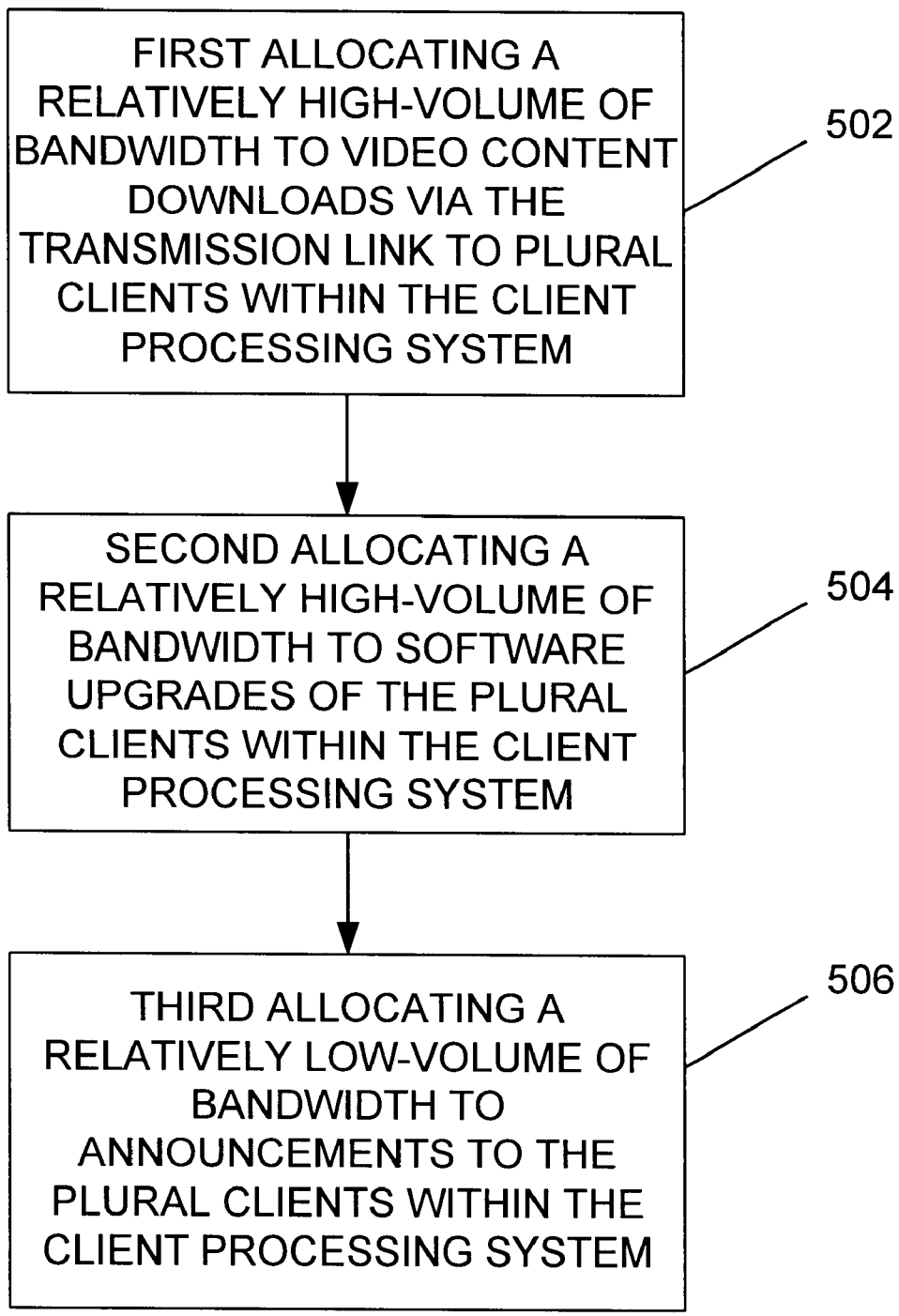
FIG. 8 is a flowchart illustrating the method of the invention for allocating satellite broadcast bandwidth among video content, software upgrades and announcements.

Finally, FIG. 8 charts the method, used in conjunction with a server processing system coupled to communicate with a client network via a satellite broadcast service provider, for allocating satellite broadcast bandwidth. The method includes the steps of, at 500, first allocating a relatively high-volume of bandwidth to video content downloads via the satellite broadcast service provider to plural clients within the client network; at 502, second allocating a relatively high-volume of bandwidth to software upgrades of the plural clients within the client network; and, at 504, third allocating a relatively low-volume of bandwidth to announcements to the plural clients within the client network. This method is described in more detail above by reference to FIG. 2. It will be understood that such method steps 500, 502 and 504 in accordance with the invention are implemented in software residing within server 12 or satellite broadcast service provider 14 or both.

While the invention has been disclosed in its preferred form, the specific embodiments thereof as disclosed and illustrated herein are not to be considered in a limiting sense as numerous variations are possible. Applicants regard the subject matter of their invention to include all novel and non-obvious combinations and subcombinations of the various elements, features, functions and/or properties disclosed herein. No single feature, function, element or property of the disclosed embodiments is essential. The following claims define certain combinations and subcombinations which are regarded as novel and non-obvious. Other combinations and subcombinations of features, finctions, elements and/or properties may be claimed through amendment of the present claims or presentation of new claims in this or a related application. Such claims, whether they are broader, narrower or equal in scope to the original claims, are also regarded as included within the subject matter of applicants' invention.

What is claimed is:

1. In a system that includes a server system and broadcast service provider comprised of at least one of a satellite broadcast service and a cable network, and a plurality of client systems coupled to the server system and the broadcast service provider, a method of updating information at the plurality of client systems by using relatively high bandwidth, one-way data communication capability of the broadcast service provider to download the updated information in order to reduce the need for using relatively low bandwidth, two-way data communication capability used when connecting to the server system, the method comprising:

at a client system, receiving from the broadcast service provider scheduling information including a scheduled time for when updated information is to be transmitted to the client systems wherein the scheduling information is generated at the server system and communicated to the broadcast service provider prior to being sent to the client system; and at client system, receiving at the scheduled time, updated information that is being broadcast on a relatively high bandwidth, one-way data communication channel of the broadcast service provider, wherein the server system allocates the use of the relatively high bandwidth, one-way communication channel and communicates the updated information to the broadcast service provider upon formatting and allocating the updated information for high bandwidth data communication, and wherein the broadcast service provider broadcasts the updated information on the relatively high bandwidth communication channel to the client system at the scheduled time.

2. A computer program product for use in a system that includes a server system and broadcast service provider comprised of at least one of a satellite broadcast service and a cable network, and a plurality of client systems coupled to the server system and the broadcast service provider, the computer program product being configured to implement a method of updating information at the plurality of client systems by using relatively high bandwidth, one-way data communication capability of the broadcast service provider to download the updated information in order to reduce the need for using relatively low bandwidth, two-way data communication capability used when connecting to the server system, the computer program product comprising:

computer-readable media carrying computer-executable instructions, that when executed at the computing system, cause the computing system to perform the method, the method including the acts of:

at a client system, receiving from the broadcast service provider scheduling information including a scheduled time for when updated information is to be transmitted to the client systems, wherein the scheduling information is generated at the server system and communicated to the broadcast service provider prior to being sent to the client system; and at a client system, receiving at the scheduled time, updated information that is being broadcast on a relatively high bandwidth, one-way data communication channel of the broadcast service provider, wherein the server system allocates the use of the relatively high bandwidth, one-way communication channel and communicates the updated information to the broadcast service provider upon formatting and allocating the updated information for high bandwidth data communication, and wherein the broadcast service provider broadcasts the updated information on the relatively high bandwidth communication channel to the client system at the schedule time.

3. A method as recited in claim 1 or claim 2, further including an act of writing the updating information to memory at at least one of the client systems.

4. A method as recited in claim 3, wherein the updating information updates information previously stored by the at least one client system.

5. A method as recited in claim 3, wherein the updated information includes computer program instructions which, when executed by the at least one client system, causes the at least one client system to perform a sequence of actions.

6. A method as recited in claim 5, wherein the at least one client system selectively executes the computer program instructions.

7. A method as recited in claim 5, wherein the at least one client system only executes the computer program instructions when a defined set of criteria are satisfied.

8. A method as recited in claim 7, wherein the updating information further includes the defined set of criteria.

9. A method as recited in claim 5, wherein the computer program instructions include at least one configuration script.

10. A method as recited in claim 9, wherein the at least one configuration script includes alternative configuration scripts which represent alternative versions of operating system software for the client systems.

11. A method as recited in claim 3, wherein the updated inflation is written to non-volatile memory.

12. A method as recited in claim 3, wherein the updated information is written to non-volatile memory.

13. A method as recited in claim 3, wherein the updated information is written to programmable read-only memory.

14. A method as recited in claim 3, wherein the updated information is written to flash memory.

15. A method as recited in claim 3, wherein the updated information is written to a data storage disk.

16. A method as recited in claim 3, wherein the scheduling information is received independent of any input from a user of the client systems.

17. In a system that includes a server system and broadcast service provider comprised of at least one of a satellite broadcast service and a cable network, and a plurality of client systems coupled to the server system and the broadcast service provider, a method of updating information at the plurality of client systems by using relatively high bandwidth, one-way data communication capability of the broadcast service provider to download the updated information in order to reduce the need for using relatively low bandwidth, two-way data communication capability used when connecting to the server system, the method comprising:

at the server system, generating scheduling information for when updated information is to be transmitted to the client systems;

communicating the scheduling information from the server system to the broadcast service provider wherein the scheduling information for when updated information is to be transmitted to the client systems is received at the client systems from the broadcast service provider;

at the server system, formatting the updated information that is to be downloaded to the client systems;

at the server system, allocating the use of relatively high bandwidth, one-way data communication capability of the broadcast service provider for downloading tie updated information;

communicating the updated information, as formatted and allocated for high bandwidth data communication, from the server system to the broadcast service provider; and;

at the broadcast service provider, broadcasting at the scheduled time the updated information on a relatively high bandwidth, one-way communication channel to the plurality of client systems, wherein the client systems receive at the scheduled time, the updated information that is being broadcast one the relatively high bandwidth, one-way data communication channel of the broadcast service provider.

18. A computer program product for use in a system that includes a server system and broadcast service provider comprised of at least one of a satellite broadcast service and a cable network, and a plurality of client systems coupled to the server system and the broadcast service provider, the computer program product being configured to implement a method of updating information at the plurality of client systems by using relatively high banwdwidth, one-way data communication capability of the broadcast service provider to download the updated information in order to reduce the need for using relatively low bandwidth, two-way data communication capability used when connecting to the server system, the computer program product comprising:

computer-readable media carrying computer-executable instructions, that when executed at the computing system, cause the computing system to perform the method, the method including the acts of:

at the server system, generating scheduling information for when updated information is to be transmitted to the client systems;

communicating the scheduling information from the server system to the broadcast service provider, wherein the scheduling information for when updated information is to be transmitted to the client systems is received at the client systems from the broadcast service provider;

at the server system, formatting the updated information that is to be downloaded to the client systems;

at the server system, allocating the use of relatively high bandwidth, one-way data communication capability of the broadcast service provider for downloading the updated information;

communicating the updated information, as formatted and allocated for high bandwidth data communication, from the server system to the broadcast service provider; and at the broadcast service provider, broadcasting at the scheduled time the updated information on a relatively high bandwidth, one-way communication channel to the plurality of client systems wherein the client systems receive, at the scheduled time, the updated information that is being broadcast one the relatively high bandwidth, one-way data communication channel of the broadcast service provider.

19. A method as recited in claim 17 or claim 18, further including an act of writing the updating information to memory at at least one of the client systems.

20. A method as recited in claim 19, wherein the updating information updates information previously stored by the at least one client system.

21. A method as recited in claim 19, wherein the updated information includes computer program instructions which, when executed by the at least one client system, causes the at least one client system to perform a sequence of actions.

22. A method as recited in claim 21, wherein the computer program instructions include at least one configuration script.

23. A method as recited in claim 22, wherein the at least one configuration script includes alternative configuration scripts which represent alternative versions of operating system software for the client systems.

24. A method as recited in claim 19, wherein the scheduling information is received independent of any input from a user of the client systems.

25. A method as recited in claim 19, wherein the one-way data communication capability of the broadcast service provider is characterized by a defined bandwidth, and wherein the method farther comprises an act of allocating, at the server, such defined bandwidth in a defined manner between the updated information and the scheduling information to provide relatively high bandwidth to said updating information and relatively low bandwidth to said scheduling information.

26. In a system that includes a server system and broadcast service provider comprised of at least one of a satellite broadcast service and a cable network, and a plurality of client systems coupled to the server system and the broadcast service provider, a method of updating information at the plurality of client systems by using relatively high bandwidth, one-way data communication capability of the broadcast service provider to download the updated information in order to reduce the need for using relatively low bandwidth, two-way data communication capability used when connecting to the server system, the method comprising:

at the server system, generating scheduling information for when updated information is to be transmitted to the client systems;

communicating the scheduling information from the server system to the broadcast service provider;

at the server system, formatting the updated information that is to be downloaded to the client systems;

at the server system, allocating the use of relatively high bandwidth, one-way data communication capability of the broadcast service provider for downloading the updated information;

at the client systems, receiving from the broadcast service provider scheduling information provided by the server system for when updated information is to be transmitted to the client systems;

communicating the updated information, as formatted and allocated for high bandwidth data communication, from the server system to the broadcast service provider;

at the broadcast service provider, broadcasting at the scheduled time the updated information on a relatively high bandwidth, one-way communication channel to the plurality of client systems; and at the client systems, receiving at the scheduled time, updated information that is being broadcast on a relatively high bandwidth, one-way data communication channel of the broadcast service provider, updated information provided by the server system to the broadcast service provider.

27. A computer program product for use in a system that includes a server system and broadcast service provider comprised of at least one of a satellite broadcast service and a cable network, and a plurality of client systems coupled to the server system and the broadcast service provider, the computer program product being configured to implement a method of updating information at the plurality of client systems by using relatively high bandwidth, one-way data communication capability of the broadcast service provider to download the updated information in order to reduce the need for using relatively low bandwidth, two-way data communication capability used when connecting to the server system, the computer program product comprising:

computer-readable media carrying computer-executable instructions, that when executed at the computing system, cause the computing system to perform the method, the method including the acts of:

at the server system, generating scheduling information for when updated information is to be transmitted to the client systems;

communicating the scheduling information from the server system to the broadcast service provider;

at the server system, formatting the updated information that is to be downloaded to the client systems;

at the server system, allocating the use of relatively high bandwidth, one-way data communication capability of the broadcast service provider for downloading the updated information;

at the client systems, receiving from the broadcast service provider scheduling information provided by the server system for when updated information is to be transmitted to the client systems;

communicating the updated information, as formatted and allocated for high bandwidth data communication, from the server system to the broadcast service provider;

at the broadcast service provider, broadcasting at the scheduled time the updated information on a relatively high bandwidth, one-way communication channel to the plurality of client systems; and at the client systems, receiving at the scheduled time, updated information that is being broadcast on a relatively high bandwidth, one-way data communication channel of the broadcast service provider, updated information provided by the server system to the broadcast service provider.

28. A method as recited in claim 26 or claim 27, further including an act of writing the updating information to memory at at least one of the client systems.

29. A method as recited in claim 28, wherein the updating information updates information previously stored by the at least one client system.

30. A method as recited in claim 28, wherein the updated information includes computer program instructions which, when executed by the at least one client system, causes the at least one client system to perform a sequence of actions.

31. A method as recited in claim 30, wherein the computer program instructions include at least one configuration script.

32. A method as recited in claim 31, wherein the at least one configuration script includes alternative configuration scripts which represent alternative versions of operating system software for the client systems.

33. A method as recited in claim 28, wherein the scheduling information is received independent of any input from a user of the client systems.

34. A method as recited in claim 28, wherein the one-way data communication capability of the broadcast service provider is characterized by a defined bandwidth, and wherein the method further comprises an act of allocating, at the server, such defined bandwidth in a defined manner between the updated information and the scheduling information to provide relatively high bandwidth to said updating information and relatively low bandwidth to said scheduling information.

* * * * *

UNITED STATES PATENT AND TRADEMARK OFFICE
CERTIFICATE OF CORRECTION

PATENT NO.   : 6,614,804 B1
DATED        : September 2, 2003
INVENTOR(S)  : McFadden et al.

It is certified that error appears in the above-identified patent and that said Letters Patent is hereby corrected as shown below:

Column 1,
Line 31, after "completed over" please delete "plan" and insert -- plain --
Line 52, after "available" please delete "on line" and insert -- online --

Column 4,
Line 1, after "and a network" please insert -- 15 --

Column 8,
Line 33, after "provider 14, e.g." please delete "Echostar" and insert -- Echostar$^{TM}$ --

Column 10,
Line 12, after "of features," please delete "finctions" and insert -- functions --
Line 35, after "client systems" please insert -- , --
Line 39, before "client system" please insert -- a --

Column 11,
Line 48, before "is written" please delete "inflation" and insert -- information --

Column 12,
Line 9, after "service provider" please insert -- , --
Line 18, after "for downloading" please delete "tie" and insert -- the --
Line 23, after "and" please delete ";"
Line 28, after "receive" please insert -- , --
Line 29, after "broadcast" please delete "one" and insert -- on --

Column 13,
Line 6, after "broadcast" please delete "one" and insert -- on --

UNITED STATES PATENT AND TRADEMARK OFFICE
CERTIFICATE OF CORRECTION

PATENT NO. : 6,614,804 B1
DATED : September 2, 2003
INVENTOR(S) : McFadden et al.

It is certified that error appears in the above-identified patent and that said Letters Patent is hereby corrected as shown below:

Column 13 (cont'd),
Line 32, after "the method" please delete "farther" and insert -- further --

Signed and Sealed this

Twenty-fifth Day of May, 2004

JON W. DUDAS
*Acting Director of the United States Patent and Trademark Office*